US006795815B2

(12) United States Patent
Zhang

(10) Patent No.: US 6,795,815 B2
(45) Date of Patent: Sep. 21, 2004

(54) COMPUTER BASED KNOWLEDGE SYSTEM

(75) Inventor: Guonan Zhang, Crofton, MD (US)

(73) Assignee: George Guonan Zhang ( * ) Notice: Subject to any disclaimer, the term of this patent is extended or adjusted under 35 U.S.C. 154(b) by 411 days.

(21) Appl. No.: 09/734,700

(22) Filed: Dec. 13, 2000

(65) Prior Publication Data

US 2002/0103777 A1 Aug. 1, 2002

(51) Int. Cl.⁷ .............................................. G06F 15/18
(52) U.S. Cl. ........................................................ 706/46
(58) Field of Search ..................................... 706/45–60

(56) References Cited

U.S. PATENT DOCUMENTS

| | | | |
|---|---|---|---|
| 4,730,259 A | | 3/1988 | Gallant |
| 4,860,214 A | | 8/1989 | Matsuda et al. |
| 4,864,490 A | * | 9/1989 | Nomoto et al. ............. 700/37 |
| 5,131,074 A | * | 7/1992 | Nakamura et al. ......... 706/52 |
| 5,245,698 A | * | 9/1993 | Matsunaga .................. 706/60 |
| 5,251,288 A | * | 10/1993 | Nomura et al. ............. 706/12 |
| 5,347,615 A | * | 9/1994 | Yamakawa et al. ......... 706/60 |
| 5,398,303 A | * | 3/1995 | Tanaka ........................ 706/45 |
| 5,432,885 A | * | 7/1995 | Nomoto et al. ............. 706/52 |
| 5,463,718 A | * | 10/1995 | Maeda et al. ............... 706/12 |
| 5,479,567 A | * | 12/1995 | Shinmura et al. .......... 706/52 |
| 5,586,217 A | * | 12/1996 | Ota et al. ..................... 706/4 |
| 5,933,818 A | * | 8/1999 | Kasravi et al. ............. 706/12 |
| 6,012,051 A | * | 1/2000 | Sammon et al. ............ 706/52 |
| 6,182,058 B1 | * | 1/2001 | Kohavi ........................ 706/45 |

FOREIGN PATENT DOCUMENTS

JP          7-191852        7/1995

OTHER PUBLICATIONS

A New Approach for Evolving Clusters, Robert E. Marmelstein and Gary B. Lamont, ACM 1998, pp. 268–274.*
Data Mining for Hypertext: A Tutorial Suvery, Soumen Chakrabarti, SCM SIGKDD Explorations Jan. 2000, pp. 1–11.*

* cited by examiner

Primary Examiner—Anthony Knight
Assistant Examiner—Michael B. Holmes

(57) ABSTRACT

The present invention relates to a computer based knowledge system for assisting persons in making decisions and predictions using a computerized knowledge tree with fuzzy logic, statistics, and mathematics methods. The invention defines a knowledge tree structure to represent and store human or data-mining knowledge. The knowledge tree has decision/prediction output(s), knowledge, weights, input factors, etc. The knowledge system enables a user to build knowledge trees based on their knowledge, expert knowledge, and data-mining knowledge. The knowledge tree can be updated dynamically with knowledge mining functions or self-learning functions. A decision or prediction is made by calculating a knowledge tree based on the input factors.

11 Claims, 6 Drawing Sheets

FIG. 1
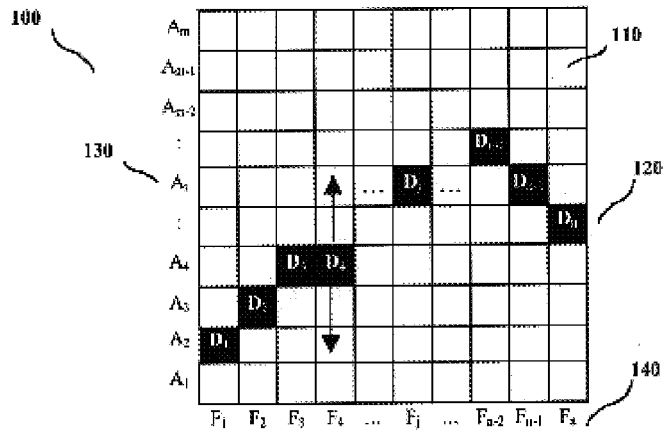
FIG. 2
| 1 | 2 | 3 | 4 | 5 | ... | ... | n-2 | n-1 | n |
|---|---|---|---|---|-----|-----|-----|-----|---|
| $A_1$ | $A_2$ | $A_3$ | $A_4$ | $A_5$ | ... | ... | $A_{n-2}$ | $A_{n-1}$ | $A_n$ |
| $D_1$ | $D_2$ | $D_3$ | $D_4$ | $D_5$ | ... | ... | $D_{n-2}$ | $D_{n-1}$ | $D_n$ |
| $F_1$ | $F_2$ | $F_3$ | $F_4$ | $F_5$ | ... | ... | $F_{n-2}$ | $F_{n-1}$ | $F_n$ |
FIG. 3
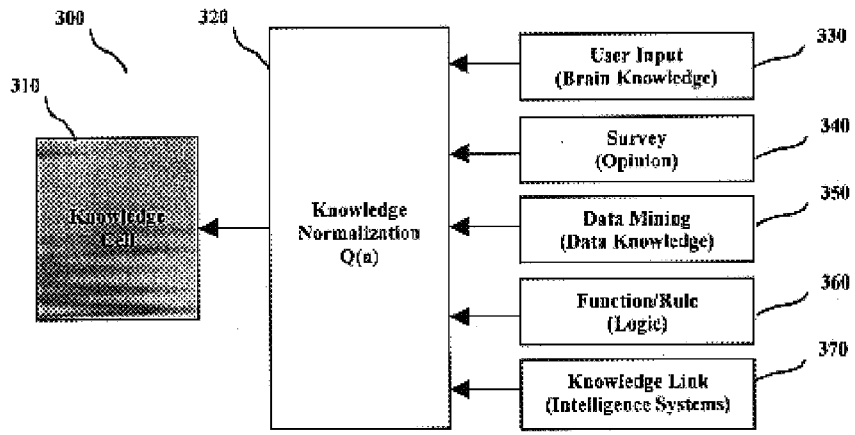

$M_{ij}(d_{ij}(t), m_{ij}(t))$= MISS_LOW$_k$ $\xrightarrow{+1}$

|   | MISS LOW | HIT | MISS HIGH |
|---|---|---|---|
| 1 |  |  |  |
| 2 |  |  |  |
| : |  |  |  |
| k | MISS_LOW$_k$ | HIT$_k$ | MISS_HIGH$_k$ |
| : |  |  |  |
| : |  |  |  |
| n |  |  |  |

COMPUTER BASED KNOWLEDGE SYSTEM

BACKGROUND OF THE INVENTION

1. Field of the Invention

The present invention relates generally to a computerized knowledge mining, intelligence analysis, and knowledge management system, specifically to analytical logic (i.e. knowledge) capturing, constructing, accumulating, and sharing.

2. Related Art

Intelligent analysis process often involves a variety of data and reasoning logic. In order to make better decisions or analyses, people need to be able to utilize multi source knowledge. The biggest issue is how we utilize multi source knowledge understandably and efficiently. For example, when developing a new stock performance evaluation method, we may like to combine different analytical logic or methods such as technical analysis, fundamental analysis, chart analysis, volume analysis, and market psychological analysis, which raises some questions. Can people quickly build the method at their skill levels? How can people combine different analytical logic and/or methods together without losing logic clarity, flexibility, scalability, and share ability? Can the combined method be easily updated and extended? All of these questions boil down to a single issue: how do we capture or computerize human analytical logic that can be easily shared, especially across analysis areas and/or industries.

Although any analytical logic can be constructed by "CASE" or "IF . . . THEN . . . ELSE . . . " programming statements, the readability, scalability, and changeability of the analytical logic often become barriers for sharing and updating knowledge when the analysis issue become more complicated.

We all agree that human analytical logic or reasoning processes can be well presented by a (decision or knowledge) tree structure. Because of the unique tree's characteristics such as independency of peer nodes and single parent node, the tree structure is a most scalable, flexible, and commonly used analytical structure. Although many decision-tree construction methods (e.g. Naïve-Bayes, Classification, Fuzzy, and Neuron Network.) have been developed, the structures of nodes are often not uniformed or standardized. Different decision-tree construction methods use different node structures. Even within the same construction method, sometimes, many different node structures (e.g. decision node, classifier node, data/factor node) are used. For a decision tree with multiple node structures, the analysis process, logic modification, and logic sharing (e.g. embed a decision tree into another decision tree that is built with a different construction method.) are often complicated, inflexible, and inefficient.

SUMMARY OF THE INVENTION

The present invention provides an open knowledge structure that defines a uniform knowledge node. Each knowledge node has a plurality of components and attributes. According to the present invention, the knowledge node includes a knowledge cell, a processing unit with a user specified evaluation function, a decision set, a user specified weight function, a learning matrix, and a user specified learning function. The values (i.e. basic knowledge or judgments) of knowledge cell can be static or dynamic. The static value can be a constant number or string. The dynamic value can come from an intelligent analysis function, a survey function, a data-mining tool, or an analysis module. A knowledge node can have zero to many inputs.

The present invention defines open structure and architecture for constructing dynamic and distributed intelligence analysis modules (i.e. knowledge trees). The knowledge tree can be stored in knowledge bases that are built with common used commercial databases (e.g. Oracle, DB2, Sybase, SQL Server and MS Access), data file, or executable file. According to the present invention, a knowledge tree has at least one knowledge node. The knowledge nodes are interlinked by using address-based link methods. The knowledge nodes or sub-trees of a knowledge tree can be stored in either identical or different knowledge bases that reside on either the same knowledge base server or different knowledge base servers.

The present invention introduces a method that can simplify the knowledge capturing processes, programming codes, and analysis processes. With the open and uniform knowledge structure and architecture, the analytical logic can be understood easily, shared across analysis areas and systems effectively, updated dynamically, and processed efficiently with peer-to-peer technology. According to the present invention, the knowledge trees can be effectively stored and managed in distributed manner. In summary, the present invention provides a knowledge-mining tool that enables people to construct their analytical logic using a variety of existing knowledge and/or methods.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings, wherein:

FIG. 1 shows visual knowledge cell structure using m×n matrix in accordance with one embodiment of the present invention.

FIG. 2 illustrates an example of physical storage for a knowledge cell (n×n) in accordance with one embodiment of the present invention.

FIG. 3 illustrates a knowledge mining method that is used to capture basic decisions or judgments for a knowledge cell in accordance with one embodiment of the present invention.

In the drawings, like reference numbers generally indicate identical, functionally similar, and/or structurally similar elements.

DETAILED DESCRIPTION OF THE PREFERRED EMBODIMENTS

Figures 4, 5:
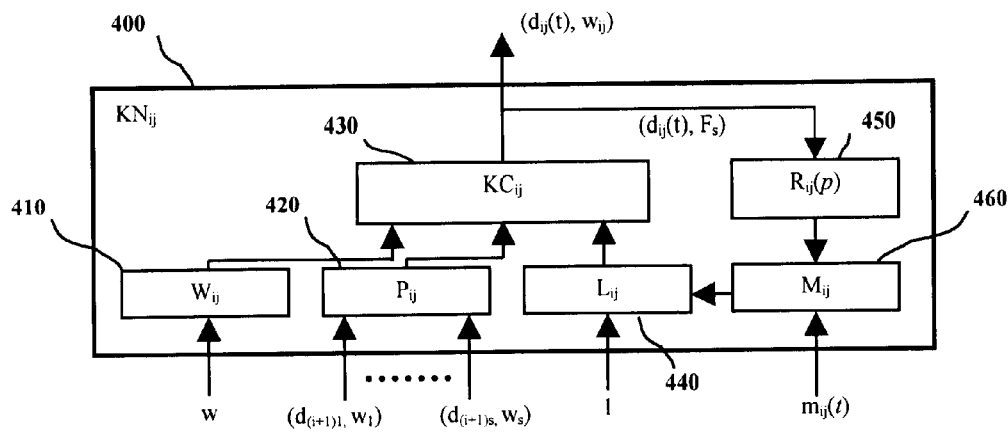
FIG. 4 shows major components of a knowledge node in accordance with one embodiment of the present invention.
FIG. 5 illustrates a hit-miss matrix of the knowledge node that uses for knowledge learning in accordance with one embodiment of the present invention.

The present invention provides an open knowledge structure (i.e. knowledge cell) and a method for constructing the Knowledge Node. Furthermore, the present invention provides a method and a computer system for inducing an Open Knowledge Tree. The Open Knowledge Tree is constructed using the knowledge nodes and dynamic address-based link methods, all knowledge nodes having the identical plurality of attributes. The Open Knowledge Tree utilizes the advantages of both decision tree structures (e.g. scalability, segmentation, and independency) and networking technologies (e.g. distributed and dynamic link).

The present invention can be used in knowledge (i.e. analytical logic) discovery and construction, intelligence analysis, intelligent device control, and knowledge management. Given the description herein, it would be obvious to one skilled in the art to implement the present invention in any general computer platform including, but not limited to, a computer processor (single chip or multi-chips), high-end to low-end workstations/servers, virtual machine (e.g. Java-created application or .Net created application), and network architectures (e.g. client/server, intranet, internet, wireless, intermediate or wide area networks).

Description in these terms is provided for convenience only. It is not intended that the invention be limited to application in this example environment. In fact, after reading the following description, it will become apparent to a person skilled in the relevant art how to implement the invention in alternative environments.

FIG. 1 shows an open knowledge cell structure 100 in accordance with one embodiment of the present invention. The open knowledge cell structure 100 includes a (m×n) matrix 110, decision functions $D_j$ (j=1,2, ..., n) 120, action functions $A_i$ (i=1,2, ..., m) 130 and factors $F_j$ (j=1,2, ..., n) 140.

Each column of the matrix 110 has only one decision function value that is generated by the corresponding decision function $D_j$ 120. The value of the decision function $D_j$ 120 indicates which action function $A_i$ (i=1,2, ..., m) 130 will be used or executed. Each column $F_j$ of the knowledge cell 100 has one and only one decision function $D_j$ 120. The action functions, $A_i$ (i=1,2, ..., m) 130, are usually arranged in a specific order (e.g. $A_i$ is an action function for the worst case or the most pessimistic decision and $A_m$ is an action function for the best case or the most optimistic decision. The functions are in an order from the worst to the best.). The value of the decision function $D_j$ 120 can be constant value or generated by a user specified function. The action function $A_i$ 130 can be a constant value (e.g. a decision or forecasting message), a user specified function, a user specified function link (e.g. an analysis report link or function call), or a user specified control command (e.g. an event trigger or control signal). The factor $F_j$ 140 can be a constant value, a user specified function, or user specified function link (e.g. a factor range generator). When using function links, the values of the knowledge cell 100 are dynamic, which enables the intelligent analysis process to always use the latest knowledge.

FIG. 2 shows an example of storing a (n×n) knowledge cell that uses a (3×n) unit storage space, where each value of the decision function $D_j$ determines which action function $A_i$ to be used for a factor $F_j$.

FIG. 3 shows a knowledge-mining method 300 in accordance with one embodiment of the present invention. The knowledge-mining process includes a knowledge cell 310, a user specified knowledge normalization function 320 and a knowledge collecting method 330, 340, 350, 360, or 370.

The knowledge-mining method 300 can create or update a knowledge cell 310 that is defined in FIG. 1. The knowledge-collecting function 330 provides an input interface for users to enter or define action, decision and/or factor range values manually. The knowledge-collecting methods 340 and 350 provide an interface and functions for users to define or link survey and/or data mining methods to generate knowledge cell values. The knowledge-collecting methods 360 and 370 provide functions for users to link existing analytic modules (e.g. knowledge trees) and/or analytic applications as knowledge cell values. The knowledge-normalization module 320 maps collected actions, decisions, factor values into range 1 ... m or 1 ... n.

FIG. 4 shows a knowledge node 400, wherein the knowledge cell is incorporated in accordance with one embodiment of the present invention. The knowledge node 400 is comprised of a weight unit 410, a processing unit 420, a knowledge cell 430, a learning function 440, a decision set 450, and a learning matrix 460.

The knowledge node 400 is a basic component for building any analysis module in accordance of the present invention. The weight unit 410 can define the node's weight in the analysis process. The node's weight can be pre-set by a user or dynamically generated by a user specified weight function. The processing unit 420 is comprised of destination (e.g. parent node or analysis result receiver) address, source (e.g. children node or function link) addresses, and a user specified input evaluation function. The knowledge cell 430 that is defined in FIG. 1 stores a basic decision. The basic decision means that a decision maker can make a quick judgment on a factor at his or her knowledge level. The learning function 440 can adjust decision values 120 of the knowledge cell 430 in terms of hit-miss ratio in the learning matrix 460. The decision set 450 can store up to p previous decision results. The previous node decision results can be used for knowledge learning. The user can decide the size (p) of the decision set 450 in terms of analysis needs. The learning matrix 460 keeps hit-miss counts for each factor $F_j$ (j=1,2, ..., n) 140.

FIG. 5 shows an example of a learning matrix that keeps decision hit-miss counts. The hit-miss counts of a node decision are categorized into miss-low, hit and miss-high in this example. Since the action functions, $A_i$ (i=1,2, ..., m) 130, are arranged in a specific order, the decision miss-low means that a decision $A_q$ was made but it should be the decision $A_r$ where r>>q(1); the decision hit means that the decision $A_q$ was right (i.e. r=q or r is close to q); the decision miss-high means that a decision $A_q$ was made but it should be the decision $A_r$ where r<<q (i.e. r is "significantly" less than q, which user defines significantly greater range). A user specified hit-miss function counts the number of decision hits or misses comparing decision values, $d_{ij}(t)$=>$A_q \in \{A_1, ... A_m\}$ that was made on a factor $F_k \in \{F_1, ... F_n\}$ at time t, with a correct decision value, $m_{ij}(t)$=>$A_r \in \{A_1, ... A_m\}$ that should be made at time t. For example, if q<<r then add 1 to counter $MISS\_LOW_k$; If q=r or q is close to r then add 1 to counter $HIT_k$; If q>>r then add 1 to counter $MISS\_HIGH_k$.

For the decision process, the node's processing unit 420 collects all input factors' values and weights $\{(d_{(i+1)1}, w_1), \ldots, (d_{(i+1)s}, w_s)\}$ from children nodes, linked functions and/or users, where the value $d_{(i+1)j} \in \{1, 2, \ldots n\}$, $j=1,2,\ldots,s$. A user specified evaluation function determines a final factor value k that determines the node decision. For example, a collected input factor-weight set is $\{(4,1), (2,1), (4,1), (5,1), (3,1), (2,1), (1,1), (4,1), (3,1), (2,1)\}$ where n of the knowledge cell in FIG. 1 is equal to 5 (i.e. n=5) and all weights are equal. Assume that an Optimistic Majority evaluation function is used, which means r is a more optimistic choice than q if r>q. Since the factor value 2 and 4 are majority input groups that have equal inputs, the factor value 4 is selected because 4 is more optimistic choice than 2. The final factor value $k \in \{1, 2, \ldots n\} =>$(i.e. determines) the factor $F_k => D_k => A_q$ where $q \in \{1, 2, \ldots m\}$ and $A_q$ is a decision of node (i, j) at time t or $d_{ij}(t) = A_q(i, j)$. The node decision $d_{ij}(t)$ and a weight value $w_{ij}$ generated by weight function 410 can be either a final decision or used as an input factor of its parent node. The node decision $d_{ij}(t)$ and $F_k$ 140 can be stored into the decision set 450 as node's learning data.

Figure 6:
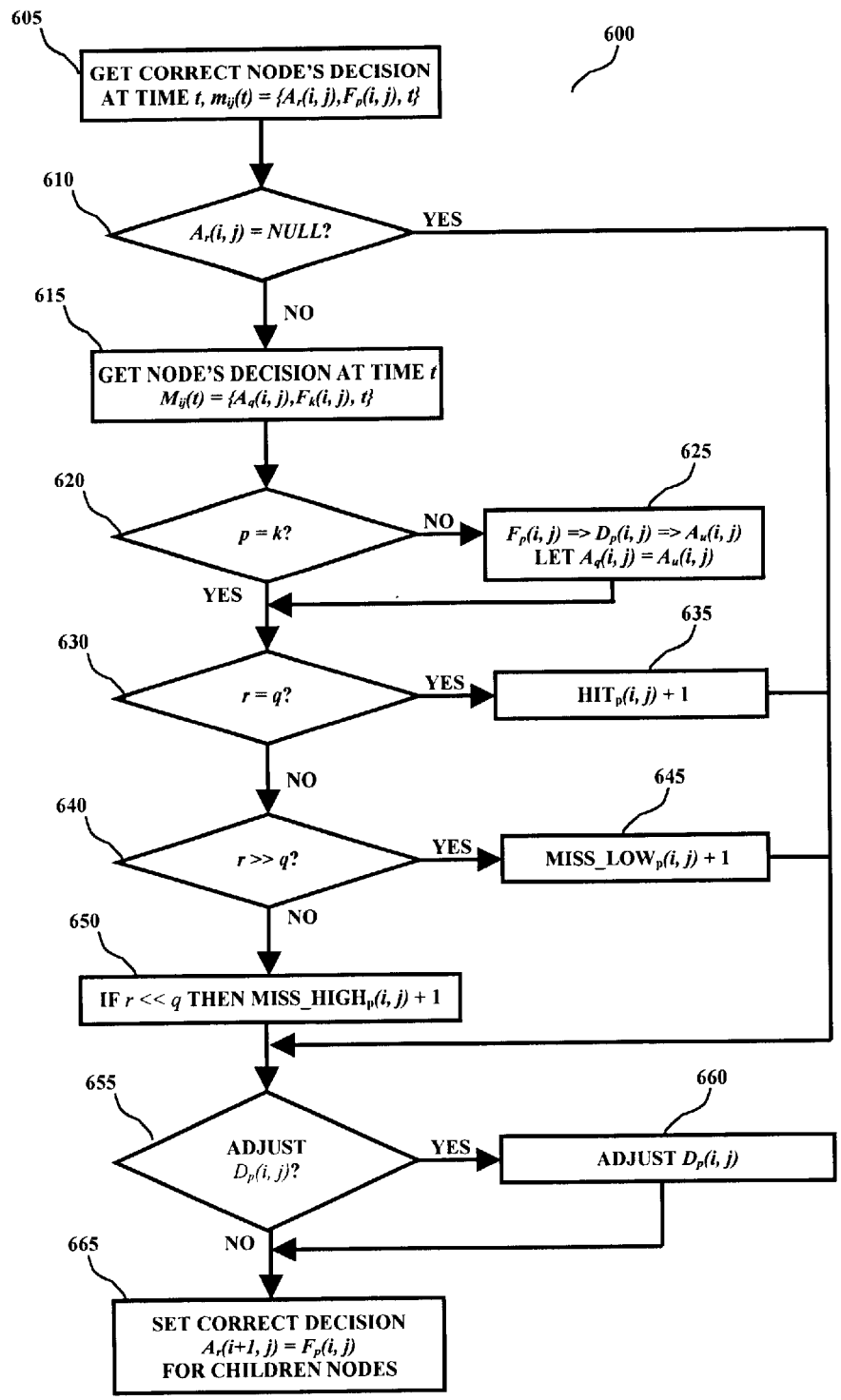
FIG. 6 is a flow diagram illustrating a method of a node's knowledge learning process of the present invention.

FIG. 6 is a flow diagram 600 illustrating the method inducing a node learning process of the knowledge tree in accordance with one embodiment of the present invention. The node learning process is comprised of node decision collecting, hit-miss counting and knowledge adjustment steps.

Referring to FIG. 6 in a step 605, the node (i, j) receives a set of correct decision and factor at time t or $m_{ij}(t) = \{A_r(i, j), F_p(i, j), t\}$. In a step 610, check if the collected decision $A_r(i, j)$ is valid (e.g. is not NULL). If $A_r(i, j)$ is valid, the flow moves to a step 615, where it begins to perform steps 615–650 for hit-miss counting and then the flow moves to a step 655 for knowledge adjustment. If $A_r(i, j)$ is invalid (e.g. is NULL or no correct decision is received), the flow moves to a step 655 for knowledge adjustment. The step 615 retrieves the node decision at time t or $M_{ij}(t) = (A_q(i, j), F_k(i, j), t)$ from the learning matrix 460. Next, in a step 620, it determines if p=k for $F_p(i, j)$ and $F_k(i, j)$. If p=k (i.e. a correct factor value was used.), the flow moves to a step 630. If p<>k (i.e. an incorrect factor value was used.), the flow moves to a step 625, where a node decision $A_u(i, j)$ for the factor value $F_p(i, j)$ is used as the node decision $A_q(i, j)$; at time t and then the flow moves to a step 630. In the step 630, it determines if r=q or r is close to q for $A_r(i, j)$ and $A_q(i, j)$. If r=q or r is close to q (i.e. a correct node decision was made.), the flow moves to a step 635, where hit counter $HIT_p(i, j)$ is added by one and then the flow moves to a step 655. If r>>q (i.e. r is "significantly" greater than q or the node decision was below the correct decision.) in a step 640, the flow moves to a step 645, where miss-low counter $MISS\_LOW_p(i, j)$ is added by one and then the flow moves to a step 655. If r<<q (i.e. r is "significantly" greater than q or the node decision was above the correct decision.), the flow moves to a step 650, where miss-high counter $MISS\_HIGH_p(i, j)$ is added by one and then the flow moves to a step 655.

Next, in a step 655, it determines if condition for adjusting the decision function $D_p(i, j)$ is met (e.g. if the total of the hit and miss counts for the factor $F_p(i, j)$ reaches to 1000?). If the condition is met, the flow moves to a step 660, where the decision function $D_p(i, j)$ is adjusted and then the condition for adjusting the decision function $D_p(i, j)$ is re-set. The step 665 sets $F_p(i, j)$ as a correct decision of all children nodes (i+1, j) of the node (i, j). The flow diagram 600 can start the node-learning process at any node (i, j) but it usually starts at the root node. The node-learning process is recursively performed for all descendant nodes of the node (i, j).

Figure 7:
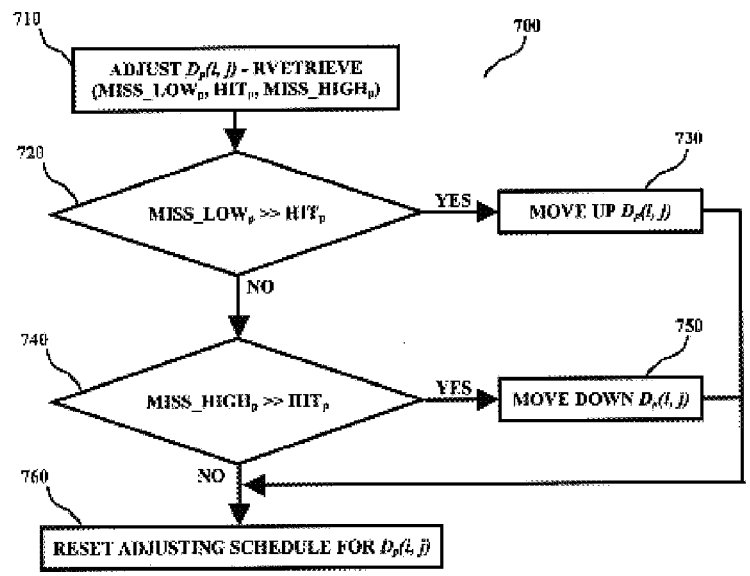
FIG. 7 is a flow diagram illustrating a method of a node's knowledge adjusting process of the present invention.

FIG. 7 is a flow diagram 700 illustrating a more specific embodiment of the step 665 of FIG. 6 for inducing a node knowledge adjusting process in accordance with one embodiment of the present invention. Step 710 retrieves hit-miss counts, $\{MISS\_LOW_p(i, j), HIT_p(i, j), MISS\_HIGH_p(i, j)\}$ and then the flow moves to a step 720. The step 720 determines if $MISS\_LOW_p(i, j) >> HIT_p(i, j)$ (i.e. miss-low count is "significantly" greater than hit count, which user defines significantly greater range). If the miss-low count is significantly greater than the hit count, the flow moves to a step 730, where it adjusts the decision function $D_p(i, j)$ value higher (e.g. if $D_p(i, j)$ is in $A_q(i, j)$'s row and q<m, set $D_p(i, j)$ to $A_q(i, j)$'s row) and then the flow moves to a step 760. If the miss-low count is not significantly greater than the hit count, the flow moves to a step 740, where it determines if $MISS\_HIGH_p(i, j) >> HIT_p(i, j)$ (i.e. miss-high count is "significantly" greater than hit count, which user defines significantly greater range). If the miss-high count is significantly greater than the hit count, the flow moves to a step 750, where it adjusts the decision function $D_p(i, j)$ value lower (e.g. if $D_p(i, j)$ is in $A_q(i, j)$'s row and q>1, set $D_p(i, j)$ to $A_{q-1}(i, j)$'s row) and then the flow moves to a step 760. If the miss-high count is not significantly greater than the hit count, the flow moves to a step 760. The step 760 re-sets the adjusting schedule for the decision $D_p(i, j)$.

Figure 8:
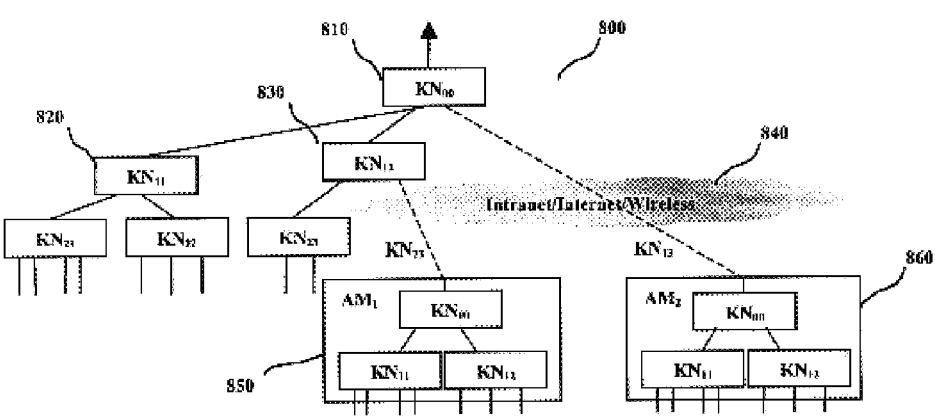
FIG. 8 illustrates an example of a distributed knowledge tree using the open knowledge tree construction method of the present invention.

FIG. 8 illustrates an example of a distributed knowledge tree that is built in the open knowledge tree structure of the present invention. The knowledge tree 800 is comprised of knowledge nodes (KN) 810 and/or sub-trees 820, 830, 850, and 860. The sub-trees 850 and 860 are independent knowledge trees or analysis modules (AM) that are linked through Internet, Intranet, or wireless network 840.

Figure 9:
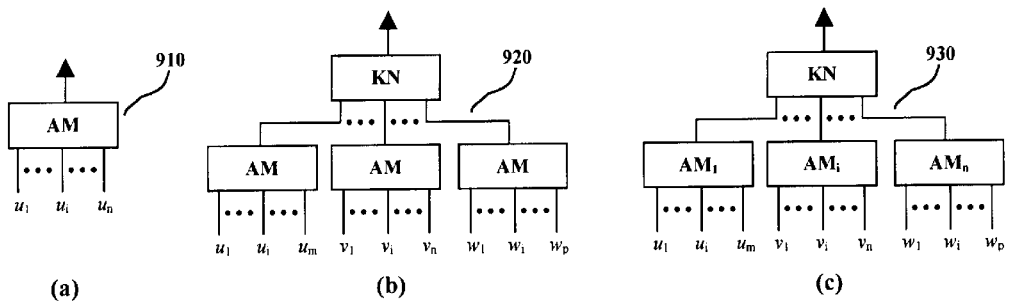
FIG. 9 illustrates three basic group analysis modules using the open knowledge tree structure in accordance with one embodiment of the present invention.

FIG. 9 illustrates three basic group analysis modules using the open knowledge structure in accordance with one embodiment of the present invention, where $u_i$, $v_i$ or $w_i$ is a set of input factor values from a user/analyst or specific analysis modules/functions. The group analysis module (AM) 910 uses different sets of input factor values, where the group analysis process is at the factor collecting level. The group analysis module 920 repeatedly uses the same analysis module and uses different sets of input factor values from different analysis groups for each analysis module, where the group analysis process is at the factor collecting and analytical result levels. The group analysis module 930 uses different analysis modules and different sets of input factor values from different analysis groups for each analysis module, where the group analysis process is at the factor collecting, analytical logic and analytical result levels.

Figure 10:
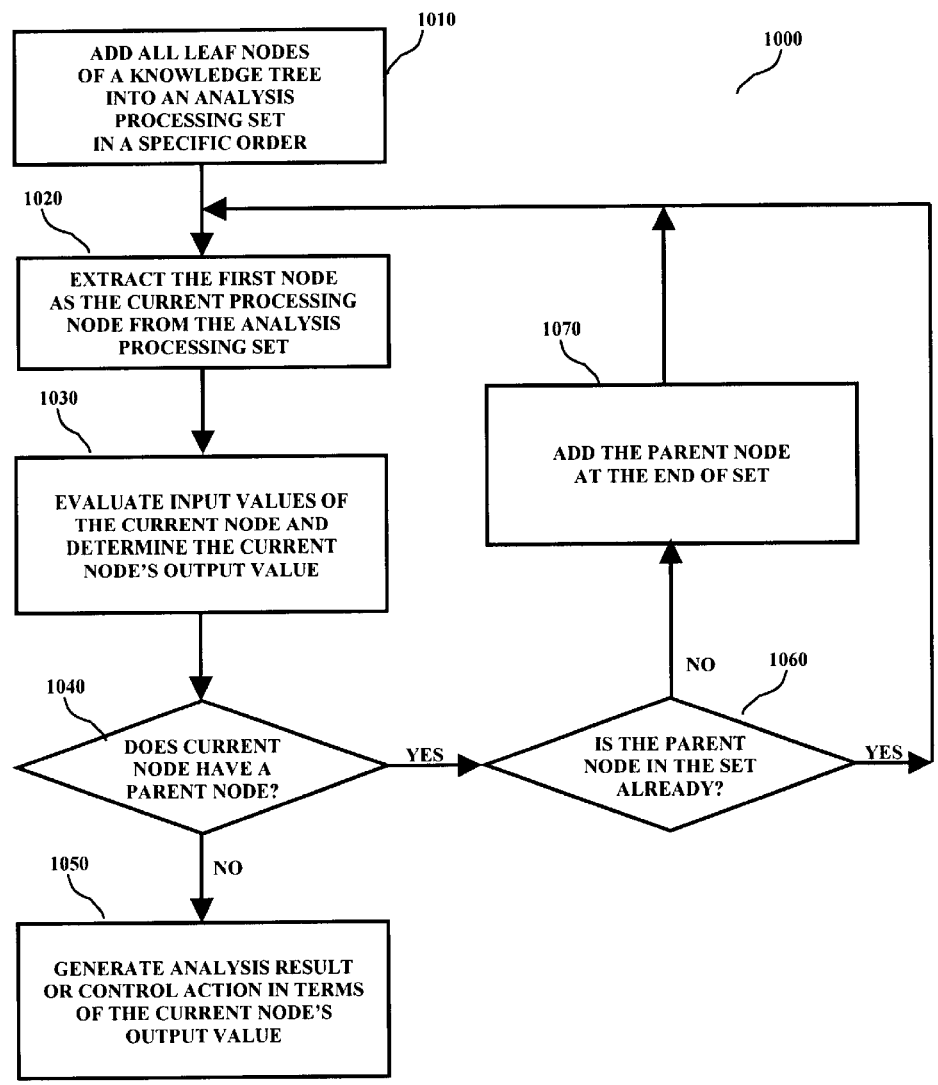
FIG. 10 is a flow diagram illustrating an analysis process method using the knowledge tree in accordance with one embodiment of the present invention.

FIG. 10 is a flow diagram 1000 illustrating an analysis process method using the knowledge tree in accordance with one embodiment of the present invention. The analysis process can start from one or many leaf nodes of a selected knowledge tree and ends up at the root node. The root node output is the analysis result or decision. For the explanation reasons, the flow diagram 1000 of FIG. 10 only processes one node at each time. The analysis process of the present invention can use multiple tasks, sessions or threads to process multiple peer nodes or peer sub-trees at the same time.

Referring to FIG. 10, in a step 1010, it adds all leaf nodes of the knowledge tree into an analysis processing set in a specific order (e.g. from the most left leaf node to the most right one). Next, in a step 1020, the analysis process extracts the first node as the current processing node. In a step 1030, it collects and evaluates all input factor values of the current node to determine its output value, where the factor values can be obtained from children nodes' outputs, users' inputs and/or functions' outputs. Next, in a step 1040, it determines if the current node has a parent node. If it has no parent node (i.e. it is the root node), the flow moves to a step 1050, where an analysis result, decision, or control action is generated in terms of the current node's output value and ends the analysis process. If the current node has a parent node, the flow moves to a step 1060, where it determines if the parent node is in the analysis processing set. If the parent node is already in the analysis processing set, the flow moves to the step 1020. If the parent node is not in the analysis processing set, the flow moves to a step 1070, where it adds the parent node of the current node into the end of the analysis processing set and then the flow moves to a step 1020, where, for each node in the analysis processing set, the flow recursively performs steps 1020–1040 until the root node is reached and processed or the analysis processing set is empty.

Figure 11:
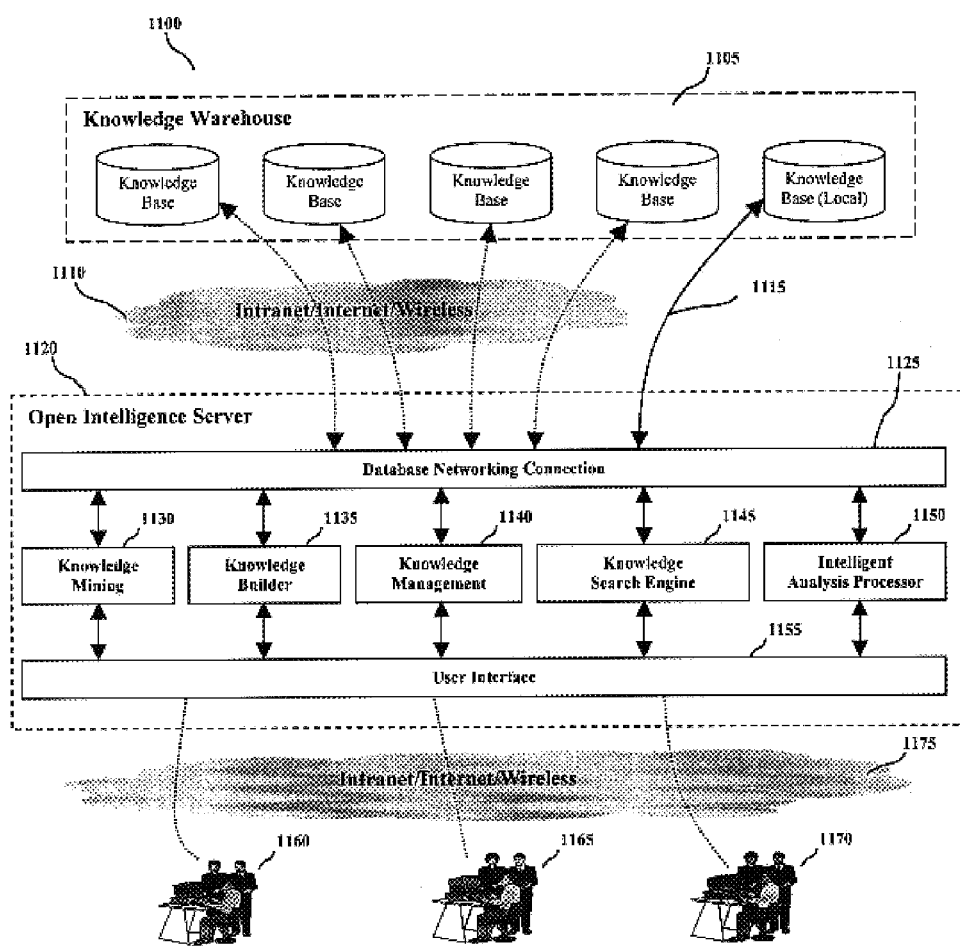
FIG. 11 illustrates a web-based open knowledge computer system wherein the knowledge tree has been constructed, stored, shared and processed.

FIG. 11 shows an open knowledge computer system 1100 wherein the knowledge tree has been constructed, stored, shared, managed, and processed. Specifically, the open knowledge computer system 1100 includes a Knowledge Warehouse 1105 and an Open Intelligence Server 1120. Furthermore, the Open Intelligence Server 1120 is comprised of a Database Networking Connection Function Library 1125, a Knowledge Ming Tool 1130, a Knowledge Builder 1135, a Knowledge Management Unit 1140, a Knowledge Search Engine 1145, a Intelligent Analysis Processor 1150, and a User Interface 1155.

The Knowledge Warehouse 1105 is a set of virtually or physically linked knowledge bases that are built on the same or different commercial databases such as Oracle, MS SQL Server, Sybase, DB2 and MS Access. The Open Intelligence Server can access knowledge bases remotely through network 1110 or locally 1115 through I/O Data Bus that the knowledge base resides on the Open Intelligence Server. Users 1160–1170 can perform knowledge construction, intelligence analysis and knowledge management through the User Interface 1155 and network 1175.

In summary, the present invention discloses an open knowledge structure, a method to construct an open knowledge node, and a method to construct an analysis module or knowledge tree with open and dynamic knowledge tree architecture, called Open Knowledge Tree. Furthermore, the present invention discloses a method of building an Open Knowledge Computer System for knowledge mining, knowledge learning, analysis processing, and knowledge management.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An open knowledge node comprising:
   a knowledge cell being defined by a (m×n) matrix $KC_{ij}$ and having an action function $A_i$ for each row, a factor function $F_j$ for each column and one and only one decision function $D_j$ for each column value;
   a weight function $W_{ij}$ for determining the node's weight to its parent node;
   an analysis processing unit $P_{ij}$ for making node's decision or control action;
   a learning function $L_{ij}$ for updating decision function $D_j$ or the decision function's value;
   a learning matrix $M_{ij}$ for counting hit-miss of the node decisions; and
   a decision set $R_{ij}(p)$ for storing node decisions.

2. A method as claimed in claim 1 for constructing an open knowledge tree or analysis module residing in a computer readable medium, said knowledge tree having at least one open knowledge node.

3. The method as claimed in claim 2 inducing, wherein the interlinking of the open knowledge nodes uses a variety of address link methods.

4. The method as claimed in claim 3 inducing, wherein the open knowledge tree's nodes can resides in one or multiple readable mediums.

5. The method as claimed in claim 3 inducing, wherein any open knowledge tree can be used as a sub-tree and linked or embedded into another open knowledge tree.

6. A method as claimed in claim 1 for knowledge mining residing in a computer readable medium, the method comprising the steps of:
   collecting knowledge data from user inputs, survey, data mining and existing functions or analysis modules;
   normalizing collected knowledge data into a value range of the knowledge node;
   setting normalized knowledge data into the knowledge node.

7. The method as claimed in claim 6 inducing, wherein said any knowledge tree can also be a knowledge collecting function.

8. A method as claimed in claim 3 inducing a knowledge learning and adjusting process, the method comprising the steps of:
   (a) getting an actual factor $F_p(i, j)$ and an actual node decision result $A_r(i, j)$ at time t; and
   (b) determining if $A_r(i, j)$ is valid,
      if $A_r(i, j)$ is not valid, moving said to step (e);
      if $A_r(i, j)$ is valid, getting said factor $F_k(i, j)$ was used and node decision $A_q(i, j)$ was made at time t; and
   (c) determining if factor $F_k(i, j)$ is equal to actual factor $F_p(i, j)$,
      if $F_k(i, j)$ is not equal to $F_p(i, j)$, setting said node decision $A_u(i, j)$ for factor $F_p(i, j)$ as $A_q(i, j)$; and
   (d) determining if node decision $A_q(i, j)$ is equal to actual node decision $A_r(i, j)$,
      if $A_r(i, j)$ is equal or close to $A_q(i, j)$, adding said one to hit counter $HIT_p(i, j)$;
      if $A_r(i, j)$ is significantly greater than $A_q(i, j)$, adding said one to miss-low counter $MISS\_LOW_p(i, j)$;
      if $A_r(i, j)$ is significantly less than $A_q(i, j)$, adding said one to miss-high counter $MISS\_HIGH_p(i, j)$; and
   (e) determining if adjusting node decision $D_p(i, j)$ is needed,
      if adjusting $D_p(i, j)$ is needed, adjusting said node decision $D_p(i, j)$ in terms of hit and miss counts; and
   (f) setting said $F_p(i, j)$ as an actual node decision result $A_r(i+1, j)$ for all children nodes of the node $(i, j)$.

9. A method as claimed in claim 2 of inducing an analysis process, wherein the method comprising the steps of:
   (a) Adding all leaf nodes of a knowledge tree into an analysis processing set in a specific order; and
   (b) Extracting the first one node as the current processing node from the analysis processing set; and
   (c) Collecting and evaluating the input values of the current processing node $(i, j)$, wherein said the node's processing unit determines a factor function $F_k$ in terms of the input factor and weight pairs, $\{(d_{(i+1)1}, w_1), \ldots,$ $(d_{(i+1)s}, w_s)\}$ from children nodes, users, knowledge trees and/or functions. Furthermore, said $F_k(i, j)$ determines a decision function $D_k(i, j)$ and $D_k(i, j)$ determines an action function $A_q(i, j)$ or $d_{ij}(t)$, wherein said the action function $d_{ij}(t)$ associated with a node weight value $w_{ij}$ is the node's decision or control action output and $\{d_{ij}(t), F_k(i, j)\}$ can be stored into a decision set as node learning data; and (d) determining if the current processing node has a parent node, if there is no parent node (i.e. the current node is a root node), moving said to step (f);

if there is a parent node, adding said the parent node into the analysis processing set if the parent node is not in the analysis processing set; and (e) recursively performing steps (b) through (d) for each node in the analysis processing set; and (f) generating an analysis result or a control action using $d_{ij}(t)$.

10. The method of inducing according to claim 9, wherein said multiple peer nodes in the analysis processing set can be processed in steps (b) through (d) in parallel or peer-to-peer processing methods.

11. An open knowledge system as claimed in claim 9, comprising:

a knowledge warehouse of a group linked knowledge bases for storing knowledge data and knowledge mining functions;

a database networking connection unit for accessing knowledge data from knowledge bases;

a knowledge mining tool for collecting multi source knowledge or analytical logic;

a knowledge builder for constructing knowledge tree and knowledge mining functions;

a knowledge management unit for managing knowledge data in the knowledge warehouse;

a knowledge searching engine for locating knowledge data and knowledge mining functions;

an intelligence analysis processor for performing intelligent analysis using knowledge trees.

* * * * *